(12) United States Patent
Choi

(10) Patent No.: US 9,267,720 B2
(45) Date of Patent: Feb. 23, 2016

(54) AIR CONDITIONER AND METHOD OF CONTROLLING THE SAME

(75) Inventor: Bongsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 13/432,314

(22) Filed: Mar. 28, 2012

(65) Prior Publication Data

US 2013/0104580 A1   May 2, 2013

(30) Foreign Application Priority Data

Oct. 27, 2011   (KR) .................... 10-2011-0110390

(51) Int. Cl.
| | |
|---|---|
| F25B 41/00 | (2006.01) |
| F25B 49/02 | (2006.01) |
| F25B 1/10 | (2006.01) |
| F25B 13/00 | (2006.01) |
| F25B 47/02 | (2006.01) |

(52) U.S. Cl.
CPC ................ F25B 49/022 (2013.01); F25B 1/10 (2013.01); *F25B 13/00* (2013.01); *F25B 47/022* (2013.01); *F25B 2313/006* (2013.01); *F25B 2313/0233* (2013.01); *F25B 2313/02741* (2013.01); *F25B 2400/0751* (2013.01); *F25B 2400/13* (2013.01); *F25B 2600/021* (2013.01); *F25B 2600/0261* (2013.01); *F25B 2600/2509* (2013.01); *F25B 2700/1931* (2013.01); *F25B 2700/1933* (2013.01); *Y02B 30/741* (2013.01)

(58) Field of Classification Search
CPC ...... F04B 49/007; F04B 49/03; F04B 49/035; F04B 49/22; F04B 49/24; F25B 2600/2501; F25B 2600/02; F25B 49/022; F25B 2400/04; F25B 2400/06

USPC .......... 62/510, 196.1, 196.2, 504, 209, 228.1, 62/160

See application file for complete search history.

(56) References Cited

U.S. PATENT DOCUMENTS 5,168,715 A  *  12/1992  Nakao et al. .................... 62/181
6,343,842 B1 *   2/2002  Sauer et al. .................. 299/79.1

(Continued)

FOREIGN PATENT DOCUMENTS

EP      1 598 616 A2    11/2005
EP      1 669 695 A2     6/2006

(Continued)

OTHER PUBLICATIONS

Korean Notice of Allowance dated Jan. 22, 2014.

(Continued)

*Primary Examiner* — Marc Norman
*Assistant Examiner* — David Teitelbaum
(74) *Attorney, Agent, or Firm* — Ked & Associates LLP

(57) ABSTRACT

An air conditioner may include an indoor device and an outdoor device. The outdoor device may include a plurality of compressors, a plurality of bypass tubes respectively connected to the plurality of compressors, and a plurality of bypass valves respectively provided to the bypass tubes. When at least one of the plurality of compressors is stopped during operation of the air conditioner and the plurality of compressors, a bypass valve corresponding to the stopped compressor may be opened to equalize an internal pressure of the stopped compressor to facilitate a re-start of operation of the stopped compressor without adversely affecting overall performance of the air conditioner.

12 Claims, 6 Drawing Sheets

(56) References Cited

U.S. PATENT DOCUMENTS

| | | | |
|---|---|---|---|
| 6,453,691 B1 | 9/2002 | Seo et al. | |
| 6,898,944 B2* | 5/2005 | Takano et al. | 62/196.4 |
| 6,955,058 B2* | 10/2005 | Taras et al. | 62/175 |
| 7,104,084 B2* | 9/2006 | Park et al. | 62/324.1 |
| 8,418,482 B2* | 4/2013 | Bush et al. | 62/117 |
| 2005/0160761 A1 | 7/2005 | Taras et al. | |
| 2011/0023514 A1* | 2/2011 | Mitra et al. | 62/222 |

FOREIGN PATENT DOCUMENTS

| | | |
|---|---|---|
| EP | 2 088 388 A1 | 8/2009 |
| JP | 03-279753 | 12/1991 |
| JP | WO 2010/041453 A1 | 4/2010 |
| KR | 10-2002-0048699 | 6/2002 |
| KR | 10-2008-0060756 A | 7/2008 |
| KR | 10-1186331 | 9/2012 |
| WO | WO 2006/118573 A1 | 11/2006 |

OTHER PUBLICATIONS

European Search Report dated Apr. 14, 2014.

Korean Office Action issued in KR Application No. 10-2011-0110390 dated Feb. 12, 2013.

Notice of Allowance dated Aug. 13, 2013 for corresponding Korean Application No. 10-2011-0110390.

* cited by examiner

AIR CONDITIONER AND METHOD OF CONTROLLING THE SAME

CROSS-REFERENCE TO RELATED APPLICATION(S)

This application claims priority under 35 U.S.C. §119 to Korean Application No. 10-2011-0110390 filed in Korea on Oct. 27, 2011, whose entire disclosure(s) is/are hereby incorporated by reference.

BACKGROUND

1. Field

This relates to an air conditioner.

2. Background

Air conditioners make use of a refrigerant cycle including a compressor, a condenser, an expansion mechanism, and an evaporator to heat/cool an indoor space and/or purify air. Air conditioners are classified into single-type air conditioners in which a single indoor unit is connected to a single outdoor unit, and multi-type air conditioners in which multiple indoor units are connected to one or more outdoor units.

The one or more outdoor units may include a compressing unit, an outdoor heat exchanger, an outdoor expansion mechanism, and an excessive cooler. The compressing unit may include a plurality of compressors. The number of operating compressors may vary according to indoor loads. One compressor may operate under a small load, and a plurality of compressors may operate under a great load.

When one of the operating compressors is stopped, the inside of the stopped compressor remains at a relatively high pressure, and should be decreased before re-starting. That is, discharge and suction pressures of the stopped compressor should be relatively balanced, or the stopped compressor may fail to re-start. Stopping another of the operating compressors to balance the high and low pressures of all the compressors and decrease the inner pressure of the stopped compressor may degrade the effectiveness of the indoor cooling or heating operation cannot be performed. In addition, when the stopped compressors restart, a large amount of time is required to reach a certain level of cycle performance, and may cause a delay in achieving a desired operating level when re-starting all of the compressors.

BRIEF DESCRIPTION OF THE DRAWINGS

The embodiments will be described in detail with reference to the following drawings in which like reference numerals refer to like elements wherein.

DETAILED DESCRIPTION

Figure 1:
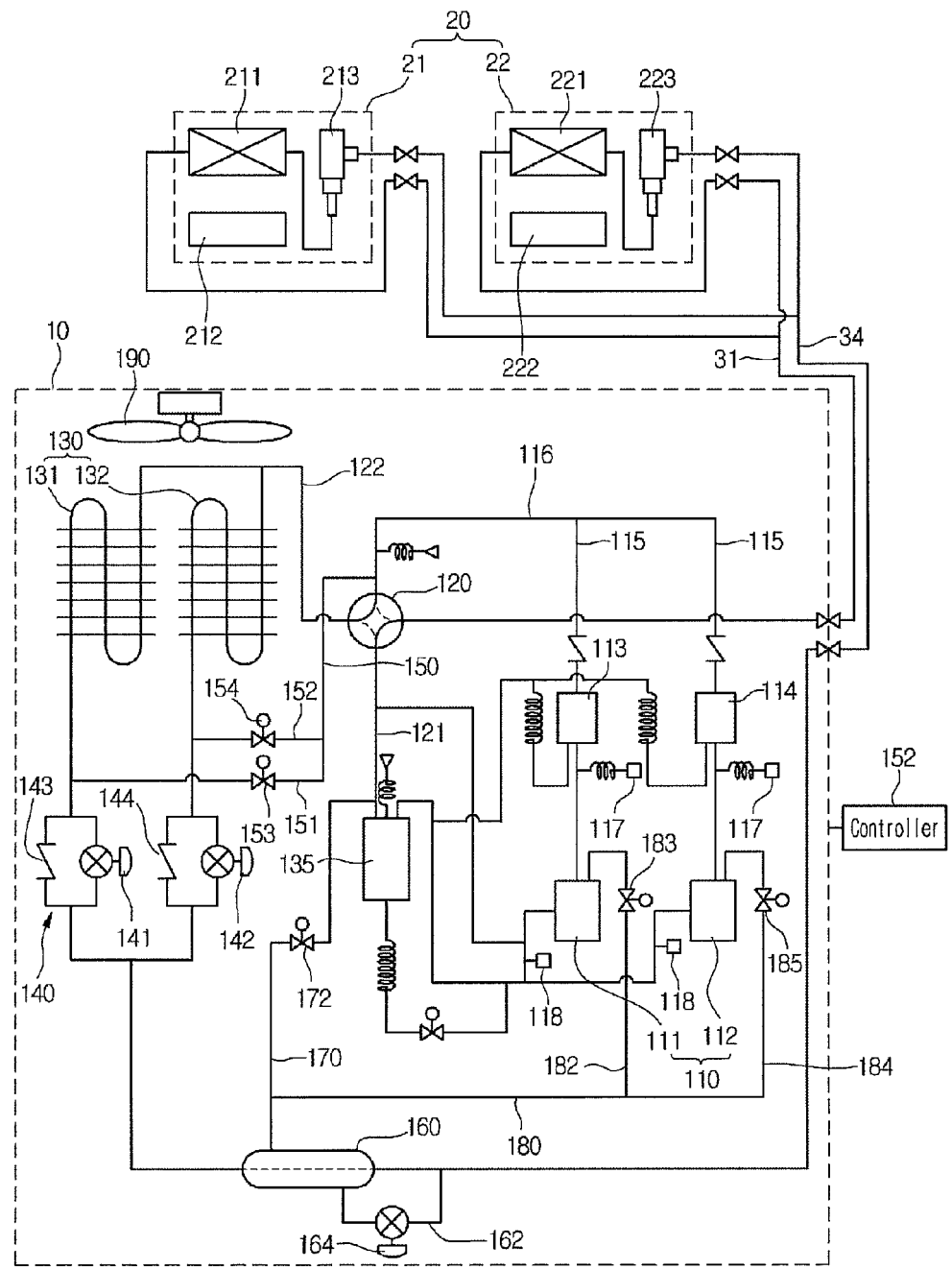
FIG. 1 is a schematic view of a refrigerant cycle of an air conditioner according to an embodiment as broadly described herein.

Hereinafter, exemplary embodiments will be described with reference to the accompanying drawings. The same elements will be designated by the same reference numerals, wherever possible, even though they may be shown in different drawings. Also, in the description of embodiments, terms such as first, second, A, B, (a), (b) or the like may be used herein when describing various components. These terms do not necessarily define an essence, order or sequence of a corresponding component, but merely distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Referring to FIG. 1, an air conditioner as embodied and broadly described herein may include an outdoor device 10 and an indoor device unit 20 connected to the outdoor device 10 through refrigerant tubes and controller by a controller 40. The indoor device unit 20 may include a plurality of indoor devices 21 and 22. In this exemplary embodiment, one outdoor device is connected to two indoor devices, simply for ease of description. However, two or more indoor devices may be connected to two or more outdoor devices, or one indoor device may be connected to one outdoor device. Various other numbers of devices and arrangements thereof/connections therebetween may also be appropriate.

The outdoor device 10 may include a compressing unit 110 for compressing refrigerant, and an outdoor heat exchanger 130 in which outdoor air exchanges heat with the refrigerant.

The compressing unit 110 may include one or more compressors. For example, the compressing unit 110 may include a plurality of compressors 111 and 112. The compressors 111 and 112 may include, for example, an inverter compressor 111 having variable capacity, and a constant-speed compressor 112. Alternatively, the compressors 111 and 112 all may be inverter compressors or constant-speed compressors. The compressors 111 and 112 may be arrayed in parallel. At least one of the compressors 111 and 112 may operate according to a capacity of the indoor device unit 20. In the exemplary embodiment shown in FIG. 1, the compressor 111 is a constant-speed compressor, and the compressor 112 is an inverter compressor.

Discharge tubes of the compressors 111 and 112 may include individual tubes 115 and a join tube 116. That is, the individual tubes 115 of the compressors 111 and 112 may join the join tube 116. The individual tubes 115 may be provided with oil separators 113 and 114 that separate oil from the refrigerant. Oil separated from the refrigerant by the oil separators 113 and 114 may be recovered to an accumulator 135, or to the compressors 111 and 112.

Tubes for connecting the oil separators 113 and 114 to the compressors 111 and 112 may be provided with high pressure sensors 117 for sensing discharge pressure of the compressors 111 and 112. Introduction tubes of the compressors 111 and 112 may be provided with low pressure sensors 118 for sensing introduction pressure of the compressors 111 and 112.

The join tube 116 may be connected to a four-way valve 120 that switches the refrigerant tubes. The four-way valve 120 may be connected to the outdoor heat exchanger 130 through a connecting tube 122. The four-way valve 120 may be connected to the accumulator 135 that may be connected to the compressing unit 110.

The outdoor heat exchanger 130 may include a first heat exchange part 131 and a second heat exchange part 132. The first and second heat exchange parts 131 and 132 may be separate heat exchangers, or a single outdoor heat exchanger may be divided into the first and second heat exchange parts 131 and 132 according to refrigerant flow. The first and second heat exchange parts 131 and 132 may be disposed horizontally or vertically. A heat exchange capacity of the first and second heat exchange parts 131 and 132 may be different or the same.

In the outdoor heat exchanger 130, the refrigerant may exchange heat with outdoor air blown by a fan motor assembly 190 that includes an outdoor fan and a fan motor. More than one fan motor assembly 190 may be provided. One fan motor assembly 190 is provided in the exemplary embodiment shown in FIG. 1.

The outdoor device 10 may include an outdoor expansion mechanism 140. The outdoor expansion mechanism 140 does not expand the refrigerant discharged from the outdoor heat exchanger 130, but does expand the refrigerant entering the outdoor heat exchanger 130.

The outdoor expansion mechanism 140 may include a first outdoor expansion valve 141 connected to the first heat exchange part 131, and a second outdoor expansion valve 142 connected to the second heat exchange part 132. A first check valve 143 may be connected in parallel to the first outdoor expansion valve 141, and a second check valve 144 may be connected in parallel to the second outdoor expansion valve 142.

The refrigerant expanded by the first outdoor expansion valve 141 flows to the first heat exchange part 131. The refrigerant expanded by the second outdoor expansion valve 142 flows to the second heat exchange part 132. The first and second outdoor expansion valves 141 and 142 may be, for example, electronic expansion valves (EEVs), or other types of valves as appropriate.

A defrosting unit may be connected to the join tube 116. The defrosting unit may be connected to tubes connecting the first and second heat exchange parts 131 and 132 to the first and second outdoor expansion valves 141 and 142. The defrosting unit may include a common tube 150, and a first individual tube 151 and a second individual tube 152 which each branch from the common tube 150. The first individual tube 151 may be connected to a tube connecting the first heat exchange part 131 to the first outdoor expansion valve 141, and the second individual tube 152 may be connected to a tube connecting the second heat exchange part 141 to the second outdoor expansion valve 142.

The first individual tube 151 may be provided with a first defrosting valve 153. The second individual tube 152 may be provided with a second defrosting valve 154. The first and second defrosting valves 153 and 154 may be, for example, solenoid valves, or other types of valves capable of adjusting flow rate. Alternatively, the defrosting unit may include first and second individual tubes without a common tube.

The first and second defrosting valves 153 and 154 may be opened in a heating operation so that high temperature refrigerant compressed by the compressing unit 110 may be introduced to the first and second individual tubes 151 and 152, allowing the high temperature refrigerant to defrost the outdoor heat exchanger 130.

The outdoor expansion mechanism 140 may be connected to an excessive cooler 160 through a liquid tube 34. The liquid tube 34 may be connected to an excessive cooling tube 162 to return the refrigerant discharged from the excessive cooler 160 to the excessive cooler 160. The excessive cooling tube 162 may be provided with an excessive cooling valve 164 to adjust a flow rate of the refrigerant and expand the refrigerant. The excessive cooling valve 164 may adjust a flow rate of the refrigerant flowing to a first refrigerant tube 170.

The excessive cooler 160, the excessive cooling tube 162, and the excessive cooling valve 164 excessively cool the refrigerant, and thus may be collectively referred to as an excessive cooling unit.

The excessive cooler 160 may be connected to the first refrigerant tube 170 communicating with the excessive cooling tube 162 and the accumulator 135. For example, the first refrigerant tube 170 may be connected to a tube 121 connecting the four-way valve 120 to the accumulator 135, or may be directly connected to the accumulator 135. The first refrigerant tube 170 may be provided with a first valve 172. The first valve 172 may be, for example, a solenoid valve.

In the embodiment shown in FIG. 1, the refrigerant is introduced from the first refrigerant tube 170 to the accumulator 135. However, in alternative embodiments the first refrigerant tube 170 may be connected to an inlet tube of the compressing unit 110. That is, the excessive cooling unit may communicate with the introduction side of the compressing unit 110 through the first refrigerant tube 170.

The first refrigerant tube 170 may be connected to a second refrigerant tube. The second refrigerant tube may include a common tube 180, and a first bypass tube 182 and a second bypass tube 184 which branch from the common tube 180. The first bypass tube 182 may be connected to the compressor 111. The second bypass tube 184 may be connected to the compressor 112. Alternatively, the first and second bypass tubes 182 and 184 may be connected to the first refrigerant tube 170. Each of the compressors 111 and 112 may include a plurality of compressing chambers to perform a multi-stage compressing operation.

Each of the first and second bypass tubes 182 and 184 may communicate with a specific one of the compressing chambers, that is, with a compressing chamber receiving refrigerant that has been compressed one or more times. For example, when a compressor includes two compressing chambers (in which refrigerant compressed in the first compressing chamber is compressed again in the second chamber), the first and second bypass tubes 182 and 184 may be connected to the second compressing chamber; and when a compressor includes three or more compressing chambers, the first and second bypass tubes 182 and 184 may be connected to one of the second and subsequent compressing chambers. In this case, the introduction side of the compressor is a low pressure region, the discharge side thereof is a high pressure region, and the first and second bypass tubes 182 and 184 are connected to a middle pressure region of the compressor.

The first bypass tube 182 may be provided with a first bypass valve 183. The second bypass tube 184 may be provided with a second bypass valve 185. The first and second bypass valves 183 and 185 may be, for example, solenoid valves. The first and second bypass valves 183 and 185 may be referred to as second valves with respect to the first valve 172 provided on the first refrigerant tube 170.

The outdoor device 10 may be connected to the indoor device unit 20 through a gas tube 31 and the liquid tube 34. The gas tube 31 may be connected to the four-way valve 120, and the liquid tube 34 may be connected to the outdoor expansion mechanism 140. That is, a tube connected to both sides of the excessive cooler 160 may be referred to as the liquid tube 34.

The indoor device 21 may include an indoor heat exchanger 211, an indoor fan 212, and an indoor expansion mechanism 213. The indoor device 22 may include an indoor heat exchanger 221, an indoor fan 222, and an indoor expansion mechanism 223. The indoor expansion mechanisms 213 and 223 may be, for example, electronic expansion valves (EEVs).

Refrigerant flow in an air conditioner in accordance with the exemplary embodiment will now be described.

Operation modes of an air conditioner as embodied and broadly described herein may include, for example, a normal mode (a normal cooling mode, a normal heating mode, or a third refrigerant flow mode), an injection mode (or a first refrigerant flow mode), and a refrigerant bypass mode (a second refrigerant flow mode). These modes may be classified according to flow directions of refrigerant.

Figure 2:
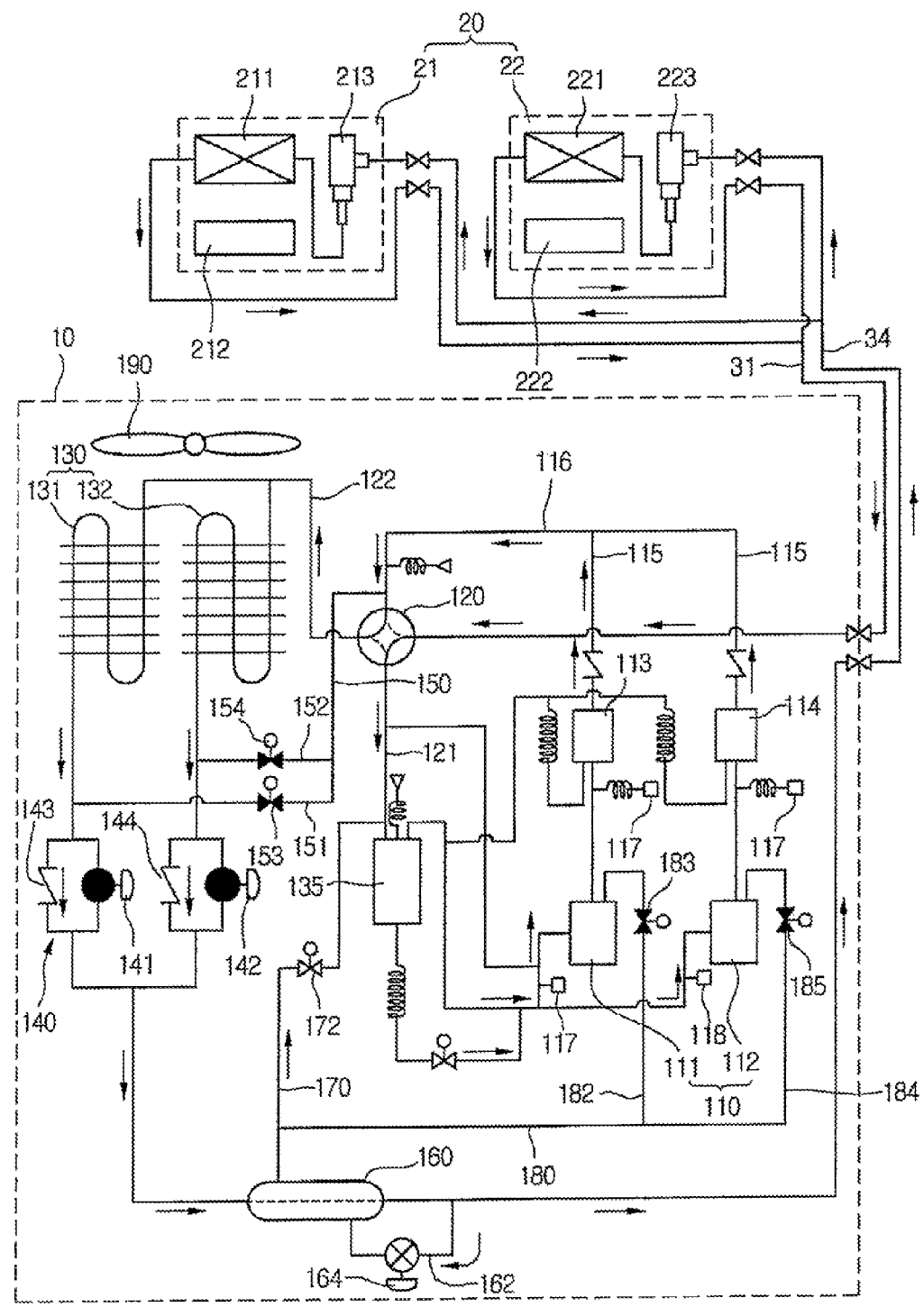
FIG. 2 is a schematic view of refrigerant flow in a normal mode of an air conditioner according to an embodiment as broadly described herein.

FIG. 2 is a schematic view of refrigerant flow in the normal mode. For ease of discussion, the normal mode described with respect to FIG. 2 will be a cooling mode.

Referring to FIG. 2, when the air conditioner operates in the normal cooling mode, refrigerant in a high temperature/high pressure state is discharged from the compressing unit 110 of the outdoor device 10, and flows to the outdoor heat exchanger 130 according to a passage control operation of the four-way valve 120, where it is condensed by the first and second heat exchange parts 131 and 132. At this point, the first and second defrosting valves 153 and 154, and the first and second outdoor expansion valves 141 and 142 are closed, preventing the refrigerant discharged from the compressing unit 110 from passing through the first and second individual tubes 151 and 152. The refrigerant discharged from the first and second heat exchange parts 131 and 132 passes through the first and second check valves 143 and 144.

The condensed refrigerant then flows through the excessive cooler 160. A portion of the refrigerant discharged from the excessive cooler 160 flows through the excessive cooling tube 162, is expanded by the excessive cooling valve 164 and is introduced back into the excessive cooler 160 to exchange heat with the condensed refrigerant flowing along the liquid tube 34.

The temperature and pressure of the refrigerant flowing through the excessive cooling tube 162 is decreased as it passes through the excessive cooling valve 164. Accordingly, the temperature of the refrigerant passing through the excessive cooling valve 164 is lower than that of the refrigerant flowing through the liquid tube 34. Thus, the condensed refrigerant is excessively cooled as it passes through the excessive cooler 160. Accordingly, the temperature of the refrigerant introduced into the indoor heat exchangers 211 and 221 is relatively low, thus increasing the amount of heat absorbed from indoor air, and improving overall cooling performance of the air conditioner.

When the air conditioner operates in the normal heating mode, the refrigerant may also be excessively cooled, and then introduced into the outdoor heat exchanger 130 to improve overall heating performance of the air conditioner.

The refrigerant discharged from the excessive cooling tube 162 sequentially flows to the excessive cooler 160 and the first refrigerant tube 170. At this point, the first valve 172 is opened, and the first and second bypass valves 183 and 185 are closed, which is the same as that in the normal heating mode. Thus, the refrigerant is introduced into the accumulator 135, without flowing to the compressors 111 and 112.

Meanwhile, the refrigerant flowing through the liquid tube 34 is introduced into the indoor devices 21 and 22, is expanded by the indoor expansion mechanisms 213 and 223, and is then introduced into the indoor heat exchangers 211 and 221. The refrigerant is evaporated in the indoor heat exchangers 211 and 221, and flows to the outdoor device 10 through the gas tube 31. Next, the refrigerant is introduced into the accumulator 135 through the four-way valve 120. Vapor refrigerant of the refrigerant introduced into the accumulator 135 is introduced into the compressing unit 110.

Figure 3:
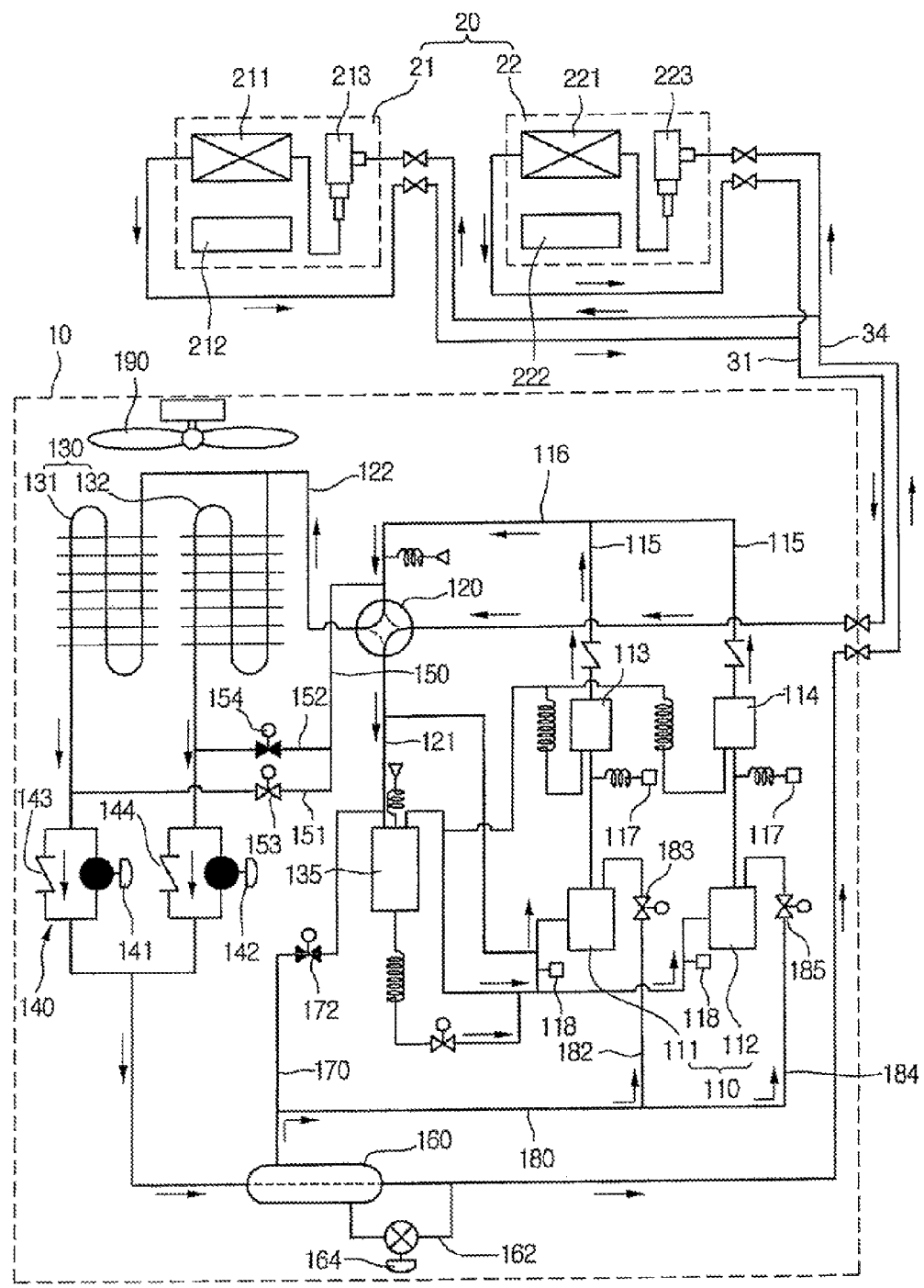
FIG. 3 is a schematic view of refrigerant flow in an injection mode of an air conditioner according to an embodiment as broadly described herein.

FIG. 3 is a schematic view illustrating refrigerant flow in the injection mode of an air conditioner, in accordance with an embodiment as broadly described herein. Particularly, FIG. 3 illustrates refrigerant flow when an air conditioner is switched from a cooling mode to the injection mode.

Referring to FIG. 3, the injection mode of the air conditioner is substantially the same as the normal cooling mode, except for operations of the first valve 172 and the first and second bypass valves 183 and 185. Thus, the difference between the injection mode and the normal cooling mode will now be described.

When the air conditioner operates in the normal cooling mode, either the difference between high and low pressures of the compressing unit 110 is greater than or equal to a reference pressure (the high pressure increases or the low pressure decreases), or a compression ratio (a ratio of high pressure to low pressure) is less than or equal to a reference compression ratio, and the first valve 172 is closed, and the first and second bypass valves 183 and 185 are opened.

Then, the refrigerant discharged from the excessive cooler 160 to the first refrigerant tube 170 is injected into the compressors 111 and 112 through the common tube 180 and the first and second bypass tubes 182 and 184. At this point, the pressure of the refrigerant injected into the compressors 111 and 112 is between a discharge pressure of the compressors 111 and 112 and an introduction pressure thereof.

Since the refrigerant injected into the compressors 111 and 112 is at a middle pressure, the difference between the high and low pressures of the compressors 111 and 112 is decreased, and the flow rate of the refrigerant discharged from the compressors 111 and 112 to a condenser (the outdoor heat exchanger 130 in the cooling mode, and the indoor heat exchangers 211 and 221 in the heating mode) is increased, thereby improving cycle performance.

When the air conditioner operates in the injection mode, either the difference between high and low pressures of the compressing unit 110 is lower than the reference pressure, or the compression ratio (a ratio of high pressure to low pressure) is greater than the reference compression ratio, and the first valve 172 is opened, and the first and second bypass valves 183 and 185 are closed. Accordingly, the air conditioner operates in the normal cooling mode.

Figure 4:
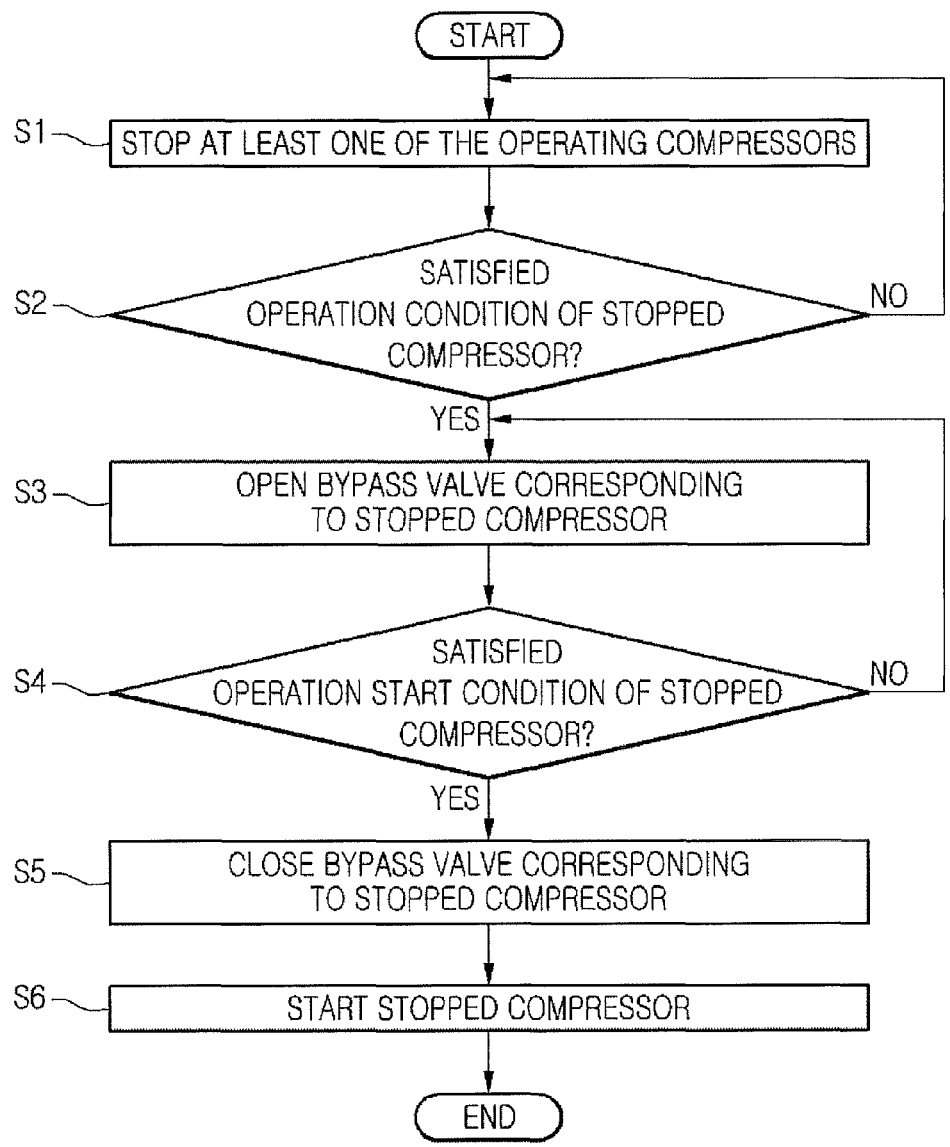
FIG. 4 is a flowchart of a method of controlling an air conditioner according to an embodiment as broadly described herein.
Figure 5:
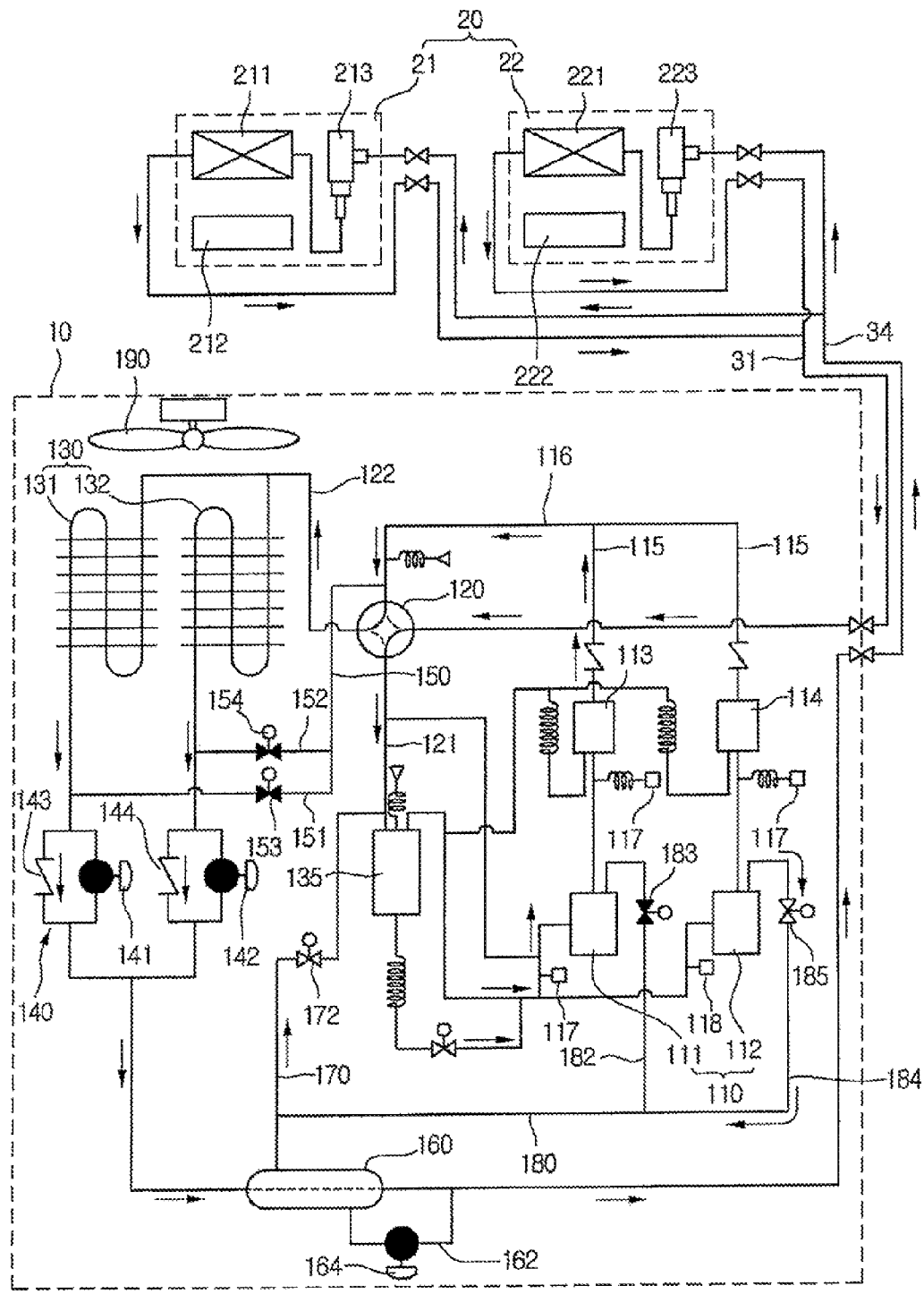
FIG. 5 is a schematic view of a control cycle for restarting some of a plurality of compressors according to an embodiment as broadly described herein.

FIG. 4 is a flowchart of a method of controlling an air conditioner as embodied and broadly described herein. FIG. 5 is a schematic view of a control cycle for restarting one or more stopped compressors, and FIG. 6 is a schematic view of a control cycle for restarting all of the stopped compressors.

Figure 6:
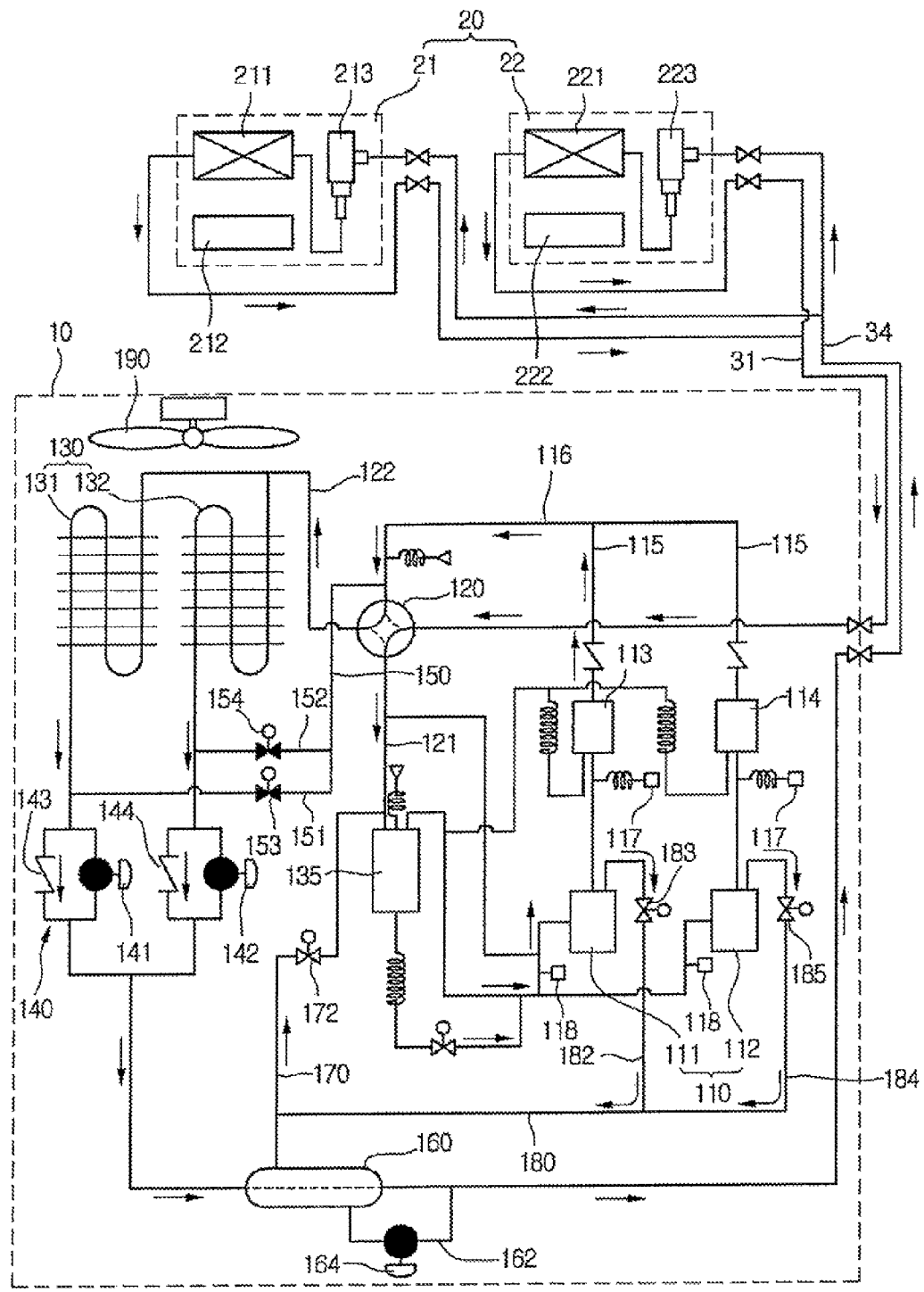
FIG. 6 is a schematic view of a control cycle for restarting all of a plurality of compressors according to an embodiment as broadly described herein.

Referring to FIGS. 4 to 6, when an operation command for the air conditioner is input, the compressing unit 110 operates. As the compressing unit 110 includes a plurality of compressors, such as, for example, the compressors 111 and 112 discussed above, a number of operating of compressors to be operated may vary, depending on an indoor load.

For example, only the first compressor 111 may operate under a relatively small indoor load, and both the first and second compressors 111 and 112 may operate under a relatively great indoor load. When the indoor load decreases while both the compressors 111 and 112 are in operation, the second compressor 112, or both the first and second compressors 111 and 112 are stopped in operation S1.

In operation S2, it is determined whether an operation condition of the stopped compressor is satisfied. That is, it is determined whether or not a current indoor load is greater than an indoor load that can be accommodated with one both of the compressors 111 and 112 stopped. At this point, the operation condition may be varied based on, for example, a total number of compressors or a total number of indoor devices.

If the operation condition of the stopped compressor is satisfied, indicating, for example that the one or more stopped compressors may be re-started to accommodate the increased load, the bypass valve corresponding to the stopped compressor is opened in operation S3. In addition, the first valve 172 is opened, and the excessive cooling valve 164 is closed. For example, referring to FIG. 5, when the second compressor 112 is stopped in a state where the first and second compressors 111 and 112 were operating, the second bypass valve 185 is opened. Then, the second compressor 112 communicates with the accumulator 135.

When the compressors 111 and 112 are both stopped, as illustrated in FIG. 6, the first and second bypass valves 183 and 185 are opened. In the current embodiment, even though the operation conditions of only some of the stopped compressors are satisfied, the bypass valves corresponding to the other stopped compressors are opened as illustrated in FIG. 6. That is, in a state where the compressors (e.g., the first and second compressors 111 and 112) are stopped, when the operation condition of, for example, the first compressor 111 is satisfied, the pressure of the second compressor 112, the operation condition of which is not satisfied, is decreased in advance, so as to decrease preparation time for starting to operate later.

The stopped compressor is in a high pressure state, and the accumulator 135 is in a low pressure state. Thus, when the bypass valve corresponding to the stopped compressor is opened, the inner pressure of the stopped compressor is decreased. That is, the difference between high and low pressures of the stopped compressor is decreased.

After the bypass valve corresponding to the stopped compressor is opened, it is determined in operation S4 whether an operation start condition of the stopped compressor is satisfied. This operation condition is used to determine whether an operation of the stopped compressor is to be resumed in response to an increase of an indoor load, and when the compressor is to resume operation.

When the operation start condition of a stopped compressor is satisfied, the difference between high and low pressures of the stopped compressor is less than or equal to the reference pressure. As described above, high pressure of a stopped compressor may be sensed by the high pressure sensor 117, and low pressure thereof may be sensed by the low pressure sensor 118.

If the operation start condition of the stopped compressor is satisfied in operation S4, the bypass valve corresponding to the stopped compressor is closed in operation S5. In operation S6, the stopped compressor starts to operate.

According to the current embodiment, when only some of a plurality of compressors are stopped, the stopped compressors resume operation in a state, i.e., a pressure condition, at which operations of the operating compressors are typically maintained, thereby preventing degradation of indoor air conditioning performance.

In addition, in a state in which some compressors are stopped while other compressors continue to operate, bypass valves corresponding to the stopped compressors are opened to decrease the pressure of the stopped compressors, so as to decrease preparation time for resuming operation of the stopped compressors later.

In addition, a bypass tube provides not only a passage for injecting refrigerant, but also a passage for providing pressure equilibrium to start a compressor, thereby simplifying a refrigerant cycle and reducing manufacturing costs.

Although the normal cooling mode is discussed herein as an exemplary operation mode of an air conditioner as embodied and broadly described herein, the normal heating mode may be exemplified without departing from the spirit and scope of the embodiment. That is, the air conditioner may be switched from the normal heating mode to the injection mode or the refrigerant bypass mode.

An air conditioner and operation method as embodied and broadly described herein may or may not include an excessive cooling unit. Even without the excessive cooling unit, a tube structure and a control method for restarting a stopped compressor are the same as described above. However, in this case, the first refrigerant tube 170 would function as the common tube 180. In addition, in this case, the first and second bypass tubes 182 and 184 may communicate with a specific one of the compressing chambers, that is, with a final compressing chamber, or with a compressing chamber just before the final compressing chamber.

When the compressor is not a multi-stage compressor, the first and second bypass tubes 182 and 184 may communicate with one compressing chamber. Alternatively, the first and second bypass tubes 182 and 184 may communicate with the discharge tube of the compressor.

Even though all the elements of the various embodiments presented herein are coupled into one or operated in the combined state, the present disclosure is not limited to such an embodiment. That is, these elements may be selectively combined with each other without departing the scope of the embodiments as broadly described herein.

In one embodiment, an air conditioner as embodied and broadly described herein may include an indoor device and an outdoor device. The outdoor device may include a plurality of compressors; a plurality of bypass tubes connected to the compressors and functioning as bypasses for refrigerant compressed in the compressors; and a plurality of bypass valves provided to the bypass tubes, respectively, wherein, in a state where at least one part of the compressors are stopped during operations of the compressors, when an operation condition of the stopped compressor is satisfied, the bypass valve corresponding to the stopped compressor is opened.

In another embodiment, a method of controlling an air conditioner including an outdoor device, as embodied and broadly described herein, may include a plurality of compressors; a plurality of bypass tubes through which the compressors communicate with introduction sides of the compressors, respectively; and a plurality of bypass valves provided to the bypass tubes, respectively, includes: stopping at least one of the compressors; determining whether an operation condition of the stopped compressor is satisfied; and opening the bypass valve corresponding to the stopped compressor when the operation condition of the stopped compressor is satisfied.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner comprising and indoor device and an outdoor device, the outdoor device comprising:
    a plurality of compressors;
    an accumulator connected to an introduction side of the plurality of compressors;
    an outer heat exchanger connected to the plurality of compressors;
    an excessive cooler connected to the outer heat exchanger;
    a first refrigerant tube communicating with the excessive cooler and the accumulator;
    a plurality of bypass tubes respectively connected to the first refrigerant tube; and
    a plurality of bypass valves respectively coupled to the plurality of bypass tubes; and
    a controller configured to control operation of the outdoor device, wherein, in a state in which at least one of the plurality of compressors is stopped, the controller is configured to open at least one bypass valve, of the plurality of bypass valves, corresponding to the at least one stopped compressor;
    wherein the at least one stopped compressor is in a low pressure state by the opening of the at least one bypass valve corresponding to the at least one stopped compressor connected to the accumulator, wherein the refrigerant flows from the at least one stopped compressor in the low pressure state to a restarting compressor of the plurality of compressors through the accumulator.

2. The air conditioner of claim 1, wherein the plurality of bypass tubes respectively communicate with introduction sides of the plurality of compressors.

3. The air conditioner of claim 1, wherein the controller is configured to close the at least one bypass valve corresponding to the at least one stopped compressor in response to a determination that an operation start condition of the at least one stopped compressor is satisfied, and to initiate operation of the at least one stopped compressor.

4. The air conditioner of claim 3, wherein the controller is configured to determine that a difference between a high pressure and a low pressure of the at least one stopped compressor is less than or equal to a reference pressure to determine that the operation start condition is satisfied.

5. The air conditioner of claim 1, wherein, in a state in which only some of the plurality of compressors are stopped during operation of the outdoor device, the controller is configured to maintain operation of the remaining plurality of compressors, and to open bypass valves corresponding to the stopped compressors.

6. The air conditioner of claim 1, wherein each of the plurality of compressors comprises a plurality of compressing chambers that provide for multi-stage compression operation, and wherein each of the plurality of bypass tubes communicates with a compressing chamber of the plurality of compressing chambers so as to receive refrigerant that has been compressed one or more times.

7. The air conditioner of claim 1, further comprising:
    the accumulator for introducing vapor refrigerant into the plurality of compressors; and
    a refrigerant tube connected to the accumulator, wherein refrigerant discharged to each of the plurality of bypass tubes is introduced into the accumulator through the refrigerant tube.

8. The air conditioner of claim 7, further comprising a common tube that connects the plurality of bypass tubes to the refrigerant tube.

9. The air conditioner of claim 7, wherein the plurality of bypass tubes are directly connected to the refrigerant tube.

10. The air conditioner according to claim 1, wherein the excessive cooler is in communication with the plurality of bypass tubes.

11. The air conditioner of claim 10, further comprising: a refrigerant tube that connects the excessive cooler with each of the plurality of compressors; and a valve provided on the refrigerant tube, wherein the controller is configured to control a position of the valve so as to allow refrigerant to flow from the excessive cooler to one or more operating compressors of the plurality of compressors through respective bypass tubes of the plurality of bypass tubes when a difference between high and low pressures of the one or more operating compressors is greater than or equal to a reference pressure, or when a compression ratio of the high pressure to the low pressure is less than or equal to a reference compression ratio.

12. The air conditioner of claim 11, wherein the controller is configured to close the valve to allow refrigerant to flow from the excessive cooler to the one or more operating compressors.

* * * * *